No. 805,898. PATENTED NOV. 28, 1905.
J. A. BEIERSCHMITT.
BIRD KILLING DEVICE.
APPLICATION FILED APR. 21, 1905.
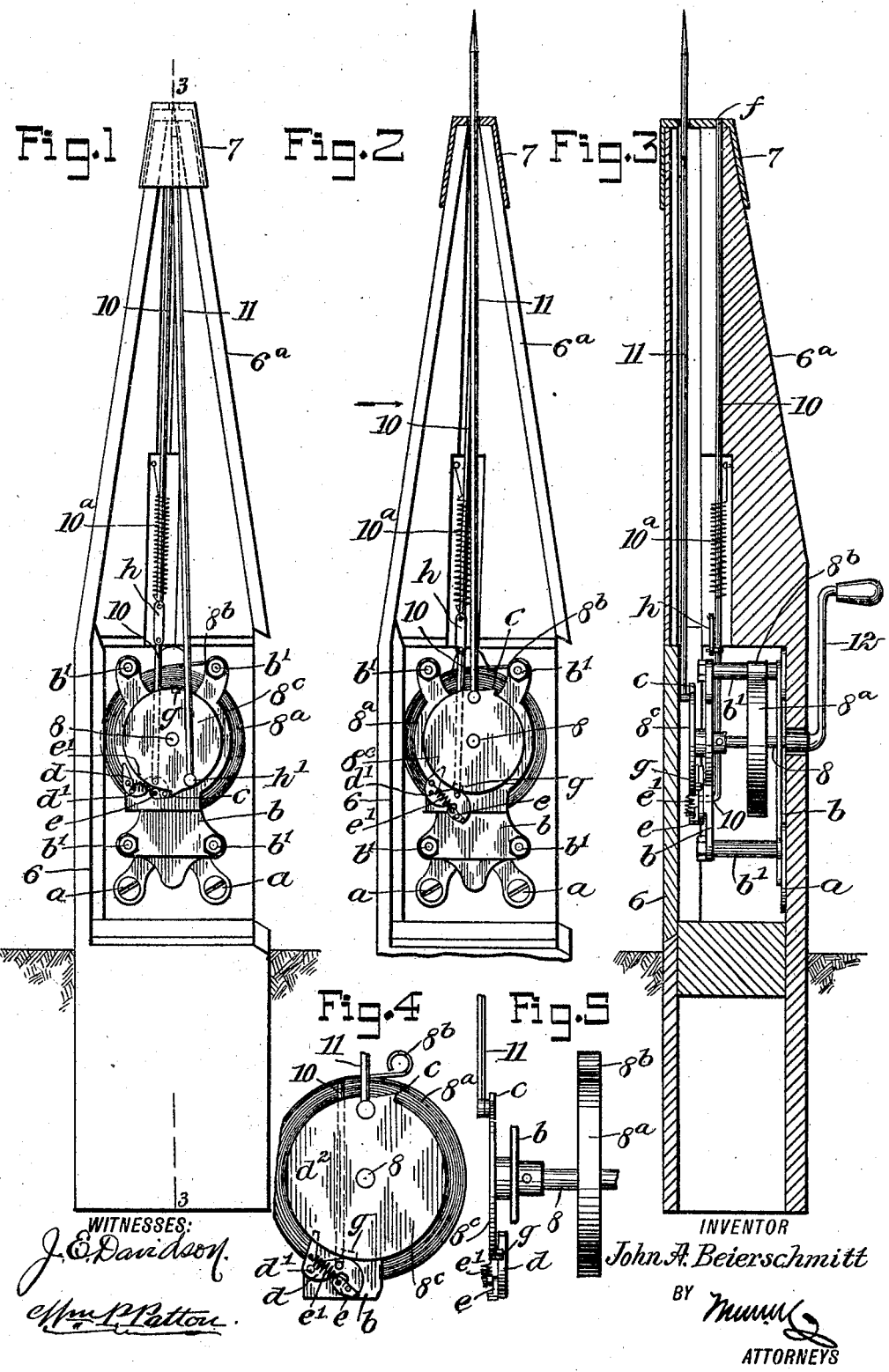
WITNESSES:
INVENTOR
John A. Beierschmitt
BY
ATTORNEYS

UNITED STATES PATENT OFFICE.

JOHN A. BEIERSCHMITT, OF LESTER TOWNSHIP, BLACKHAWK COUNTY, IOWA.

BIRD-KILLING DEVICE.

No. 805,898.
Specification of Letters Patent.
Patented Nov. 28, 1905.

Application filed April 21, 1905. Serial No. 256,758.

*To all whom it may concern:*

Be it known that I, JOHN A. BEIERSCHMITT, a citizen of the United States, and a resident of Lester township, in the county of Blackhawk and State of Iowa, have invented a new and Improved Bird-Killing Device, of which the following is a full, clear, and exact description.

In some sections of the country birds—such as crows, blackbirds, and sparrows—are very numerous and commit serious depredations in fields where fruit and vegetation are growing. In such localities it is found for the preservation of fruit, garden stuff, and cereals that means must be resorted to for the destruction of such depredators.

The object of the invention is to provide novel details of construction for a mechanical device which will stab and kill a bird that alights upon it, the device being adapted for dislodging the stricken bird and resetting its mechanism, so that it will kill a number of birds successively.

The invention consists in the novel construction and combination of parts, as is hereinafter described, and defined in the claims.

Reference is to be had to the accompanying drawings, forming a part of this specification, in which similar characters of reference indicate corresponding parts in all the figures.

Figure 1 is a side view of the device having a portion of the casing removed, exposing interior details which are adjusted for stabbing a bird that alights upon the top of the upright casing. Fig. 2 is a similar view, but showing the relative position of working parts at the time a bird has been pierced by a stabbing-rod that is a detail of the device. Fig. 3 is a sectional side view of the casing of the device substantially on the line 3 3 in Fig. 1, showing the details therein as seen in direction of the arrow in Fig. 2. Fig. 4 is an enlarged detached plan view of a helical driving-spring and operative details directly connected therewith, and Fig. 5 is a side view of parts shown in Fig. 4.

A casing 6 for reception and support of working details in proper relative positions is employed, consisting of a preferably rectangular box of proper length, the normally upper portion $6^a$ of which is tapered to the end, whereon is mounted loosely a cap-piece 7. Within the casing 6 below its tapered portion a skeleton frame is secured, as at $a\ a$, upon one side wall thereof, said frame comprising two similar side portions $b\ b$, that are spaced apart parallel with each other by cross-bars $b'$, four in number, that are secured by their ends in the corners of the side plates $b$. Oppositely in the side plates $b$ near their centers end portions of an arbor 8 are respectively journaled. Within the frame, near the side wall $b$, that is secured by the ears $a$ upon the side of the casing, a motor-spring $8^a$ is mounted and secured upon the arbor 8, said helical spring having its inner end secured upon the arbor and the outer extremity $8^b$ hooked upon one of the cross-bars $b'$, as is indicated in Fig. 3. Upon the opposite end of the arbor 8, which is extended outside of an adjacent frame side wall or plate $b$, a detent-disk $8^c$ is mounted and secured, there being a toe $c$ projected from its circular edge having ratchet-tooth form, as appears in Figs. 1, 2, and 4.

Adjacent to the periphery of the detent-disk $8^c$, upon the side wall $b$ of the frame nearest to said disk, an essentially S-shaped dog $d$ is pivoted, the pivot $d'$ engaging the dog at one bend thereof, as shown in Figs. 1, 2, and 4, so that a main portion of the flat plate-like dog may be rocked toward and from the edge of the disk. One end portion of the dog $d$ is adapted for slidable engagement with the adjacent surface of the frame side wall $b$, and upon the opposite end thereof a click or pawl $e$ is pivoted by one end, the nose of the pawl being rocked toward the periphery of the disk $8^c$ by means of a contractile spring $e'$, that is mounted upon the dog and is connected with one end of the pawl, as is clearly shown in Figs. 1, 2, and 4. A lug $g$ is formed on the side of the disk that is nearest to the frame side wall whereon the end portion of the dog $d$ rides, said lug being adapted for a frictional engagement with the convex edge of the dog that is nearest to the pawl $e$. A connecting-rod 10 is pivoted by one end upon the dog $d$, near the pawl $e$, and thence extends below the adjacent frame side wall $b$ forwardly, having its forward end secured upon the cap-piece 7, as is shown at $f$ in Fig. 3. Upon the connecting-rod 10 a short link $h$ is pivoted by one end, the forward end of said link being engaged with the rear end of a contractile spring $10^a$, which is secured at its forward end upon the frame, the tension of said spring being adapted to press the cap-piece 7 off of the tapered end of the frame a short distance and also to draw the dog $d$ toward the edge of the disk $8^c$. Upon the disk $8^c$, near the toe $c$ thereon, one end of a stabbing rod or bar 11 is pivoted, as indicated at $h'$ in the drawings, and thence extends through the tapered portion $6^a$ of the frame and likewise through the end wall of the cap-piece 7, the rod being taper-pointed, where it is held to slide through a perforation in said end wall.

A suitable key 12 is employed for winding up the helical spring $8^a$ by engagement through a perforation in a side wall of the casing 6 with a squared end of the arbor 8.

The casing 6 is of such length as adapts it to be planted as a post in the ground, so that it may form a rest whereon crows, blackbirds, or sparrows will be likely to alight. It is also to be understood that the casing may be secured upon an upright post that is part of a fence or upon any other stable object which will be of such a height as to permit the crank-handled key 12 to be used for winding up the motor-spring $8^a$.

In arranging the device for use the spring $8^a$ is wound up, the pawl $e$ serving as a detent-click by its engagement with the toe $c$, this engagement by the pawl and toe, as shown in Fig. 1, serving to retract the stabbing-rod 11, so that its pointed end will be concealed within the top of the casing 6 and cap-piece 7.

In operation when a bird alights upon the cap-piece 7 the imposed weight of the bird will rock the pawl $e$ away from the toe $c$, and thus permit the force of the spring $8^a$ to turn instantly the detent-disk $8^c$, which will simultaneously project the pointed end of the stabbing-rod 11 into the body of the bird a distance which will insure its death. The lug $g$ that has thus been carried downward contacts with the convex edge of the dog $d$ and temporarily checks the rotatable movement of the disk $8^c$, which is continued at diminished speed until arrested by the interlocking engagement of the toe $c$ with the pawl $e$, thus giving the rod a single reciprocation and the disk one revolution. It will be noted in Fig. 1 that by the completion of a revolution had by the disk $8^c$ the stabbing-rod 11 has been retracted within the upper end of the casing 6 and the connecting-rod 10 has, by the contractile force of the spring $10^a$, been lifted a short distance above the top of the casing, thus resetting the device for a second killing operation, as obviously the complete retraction of the stabbing-rod 11 releases the bird therefrom, and the dead bird falls at the side of the casing to the ground.

Slight changes in constructive details may obviously be made within the scope of my invention, and I claim the right to make such changes as are within the latitude of the claims.

Having described my invention, I claim as new and desire to secure by Letters Patent—

1. The combination with a casing, a supported rotatable arbor in the casing, means for rotating the arbor, and means for arresting the rotation thereof, of a depressible cap-piece on the top of the casing, a spring-drawn connection between the cap-piece and the arresting means, adapted to raise the cap-piece, said means being actuated by the arresting means, and a stabbing-rod, reciprocated by a turning movement of the arbor, which is released for semirotation by the depression of the cap-piece that is effected by weight imposed thereon.

2. The combination with a casing, a supported rotatable arbor in the casing, a detent-disk on one end of said arbor, a dog pivoted on the casing, and a spring-drawn pawl pivoted on the dog and adapted for arresting rotation of the detent-disk, of a loose cap-piece on the top of the casing, a rod connection between the dog and the cap-piece, a spring connecting said rod with the casing and normally raising the cap-piece, a stabbing-rod reciprocated by a turning movement of the disk and working through the cap-piece, and means for rotating the arbor.

3. The combination with a casing tapered toward the upper end, a frame secured in the casing, an arbor rotatable on the frame, a motor-spring adapted for turning the arbor, a circular detent-disk mounted upon one end of the arbor, a toe projected from the edge of the disk, and means for winding the spring by its engagement with the other end of said arbor, of a cap-piece movably mounted upon the small upper end of the casing, a spring-drawn rod connection pivoted at one end on the detent-disk and secured at its opposite end on the cap-piece, a stabbing-rod pivoted by one end on the disk adjacent to the toe thereon, said rod being pointed at the opposite end that works in the small end of the casing and through the cap-piece, a dog pivoted on the frame and adapted for engaging the toe, said dog being released from the toe so as to permit a revolution of the disk when the cap-piece is depressed.

In testimony whereof I have signed my name to this specification in the presence of two subscribing witnesses.

JOHN A. BEIERSCHMITT.

Witnesses:
P. F. DAMGE,
W. F. TREADWELL.